US011962082B2

(12) United States Patent
Zhang et al.

(10) Patent No.: US 11,962,082 B2
(45) Date of Patent: Apr. 16, 2024

(54) MULTIFUNCTIONAL GNSS ANTENNA

(71) Applicant: HARXON CORPORATION, Shenzhen (CN)

(72) Inventors: Chuang Zhang, Shenzhen (CN); Jie Zhang, Shenzhen (CN); Xiaohui Wang, Shenzen (CN)

(73) Assignee: HARXON CORPORATION, Shenzhen (CN)

(*) Notice: Subject to any disclaimer, the term of this patent is extended or adjusted under 35 U.S.C. 154(b) by 220 days.

(21) Appl. No.: 17/641,390

(22) PCT Filed: Apr. 26, 2021

(86) PCT No.: PCT/CN2021/089986
§ 371 (c)(1),
(2) Date: Mar. 8, 2022

(87) PCT Pub. No.: WO2022/021968
PCT Pub. Date: Feb. 3, 2022

(65) Prior Publication Data

US 2022/0302584 A1 Sep. 22, 2022

(30) Foreign Application Priority Data

Jul. 29, 2020 (CN) ......................... 202010745719.3

(51) Int. Cl.
*H01Q 1/52* (2006.01)
*H01Q 1/24* (2006.01)
(Continued)

(52) U.S. Cl.
CPC ............. *H01Q 1/521* (2013.01); *H01Q 1/247* (2013.01); *H01Q 1/38* (2013.01); *H01Q 1/48* (2013.01); *H01Q 1/526* (2013.01)

(58) Field of Classification Search
CPC ....... H01Q 1/38–48; H01Q 1/243–247; H01Q 1/52; H01Q 9/0407; H01Q 9/0414–0421
See application file for complete search history.

(56) References Cited

U.S. PATENT DOCUMENTS 7,436,363 B1 * 10/2008 Klein ....................... H01Q 5/00 343/757
10,205,240 B2 * 2/2019 McMichael .......... H01Q 9/0435
(Continued)

FOREIGN PATENT DOCUMENTS

CN 207217783 A 4/2018
CN 109037942 A 12/2018
(Continued)

OTHER PUBLICATIONS

MACOSX, "A wide beamwidth circularly polarized microstrip antenna, pp. 1482-1483".
(Continued)

*Primary Examiner* — Hasan Islam
(74) *Attorney, Agent, or Firm* — Franklin & Associates International Inc; Matthew F. Lambrinos

(57) ABSTRACT

Disclosed is a multifunctional GNSS antenna belonging to the technical field of communication technology, comprising: a PCB, a first dielectric plate, and a first radiating component arranged in sequence, wherein the PCB is connected with the first radiating component by a first feeding component, a second radiating component and a plurality of metalized vias are arranged on the first dielectric plate, the second radiating component is connected with the PCB by a second feeding component, the plurality of metalized vias are arranged around the first radiating component, and the second radiating component is arranged on an outer side of the plurality of metalized vias. The metalized vias increase the capacitive coupling and form the protection for the first radiating component located therein, which reduces the
(Continued)

signal interference and coupling of the third radiating component to the first radiating component effectively, which is conducive to implementation miniaturization of the antenna.

10 Claims, 3 Drawing Sheets

(51) Int. Cl.
*H01Q 1/38* (2006.01)
*H01Q 1/48* (2006.01)

(56) References Cited

U.S. PATENT DOCUMENTS

| | | | | |
|---|---|---|---|---|
| 10,483,633 | B2 * | 11/2019 | Wu | H01Q 5/307 |
| 2017/0093041 | A1 | 3/2017 | McMichael | |
| 2019/0173165 | A1 | 6/2019 | Wu et al. | |

FOREIGN PATENT DOCUMENTS

| | | | |
|---|---|---|---|
| CN | 110459871 | A | 11/2019 |
| CN | 111864382 | A | 10/2020 |
| WO | 2022021968 | A1 | 2/2022 |

OTHER PUBLICATIONS

Incoming Written Opinion of the International Searching Authority, dated Mar. 8, 2022, on a PCT No. PCT/CN2021/089986, filed Apr. 26, 2021.

* cited by examiner

MULTIFUNCTIONAL GNSS ANTENNA

CROSS-REFERENCE TO RELATED APPLICATIONS

This application is a national stage, filed under 35 U.S.C. § 371, of International Application No. PCT/CN2021/089986, filed on Apr. 26, 2021, and entitled "MULTIFUNCTIONAL GNSS ANTENNA", which claims all the benefits of the Chinese patent application No. 202010745719.3, filed on Jul. 29, 2020 before the China National Intellectual Property Administration of the People's Republic of China, each of which is explicitly incorporated herein by reference in its entirety.

FIELD

The present disclosure relates to the technical field of communication technology, and particularly, to a multifunctional GNSS antenna.

BACKGROUND

With the development of IoT (Internet of Things) communication technology and GNSS satellite navigation and positioning systems, GNSS navigation and high-precision positioning equipment are developing in the direction of miniaturization and multi-function. Functions, such as Bluetooth, Wi-Fi, and 4G mobile communication are needed, while implementing the navigation and positioning. A traditional design adopts an idea of separate designs for each antenna, which increases the number of antennas and the equipment costs, and is also not conducive to miniaturization. At present, it is generally to integrate antennas that designed separately, such as placing 4G antennas and WIFI antennas around the GNSS antenna directly.

During the process of implementing the present disclosure, inventor found at least the following shortcomings in the related technology: Although the size of the antenna is reduced to a certain extent, this method does not take the interference and coupling between the antennas into account, in particular, which is prone to GNSS signals interference, reducing the positioning accuracy, and even causing the satellite mismatching.

SUMMARY

In order to solve the problem of interference and coupling between antennas of the GNSS antennas in related art, the present disclosure provides a multifunctional GNSS antenna. The technical solution is as follows:

A multifunctional GNSS antenna, comprises a PCB, a first dielectric plate, and a first radiating component arranged in sequence, wherein the PCB is connected with the first radiating component by a first feeding component; a second radiating component and a plurality of metalized vias are arranged on the first dielectric plate, the second radiating component is connected with the PCB by a second feeding component; the plurality of metalized vias are arranged around the first radiating component, and the second radiating component is arranged on an outer side of the plurality of metalized vias.

Optionally, the first dielectric plate is provided with a boss arranged around the first radiating component and provided with the metalized vias.

Optionally, the multifunctional GNSS antenna further comprises: a second dielectric plate arranged on the first radiating component and a third radiating component arranged on the second dielectric board, wherein the third radiating component is connected with the PCB by a third feeding component.

Optionally, the boss comprises a plurality of sections along the circumferential direction of the first radiating component, a positioning groove is arranged between the two adjacent sections of the boss, and a positioning block embedded in the positioning groove is provided on the second dielectric plate.

Optionally, the metalized vias is provided in the positioning groove, the positioning block is fastened with the positioning groove by a stud cooperated with the metalized vias located on the positioning groove.

Optionally, the PCB is provided with a first circuit network and a second circuit network; the first circuit network comprises a feeding network, a first filter circuit, and a low-noise amplifier circuit connected in sequence; the feeding network is connected with the first feeding component and said third feeding component, respectively; and the second circuit network comprises a second filter circuit connected with the second feeding component.

Optionally, the first circuit network and the second circuit network are arranged on a side of the PCB away from the first dielectric board, a shielding cover is arranged on the side of the PCB away from the first dielectric board, the first circuit network and the second circuit network are covered inside the shielding cover.

Optionally, the second radiating component is provided with a grounding short-circuit post; an end of the grounding short-circuit post is connected with the second radiating component; and another end of the grounding short-circuit post is grounded.

Optionally, the second radiating component comprises a plurality of metal layers connected with each other; the plurality of the metal layers comprises at least one metal layer arranged on a surface of the first dielectric plate and at least one metal layer arranged on a side surface of the first dielectric plate.

Optionally, the multifunctional GNSS antenna comprises a plurality of the second radiating components arranged along the circumferential direction of the perimeter of the first dielectric plate.

The technical solutions provided by the examples of the present disclosure may include the following beneficial effects:

the present disclosure provides a multifunctional GNSS antenna, comprising: a PCB, a first dielectric plate, and a first radiating component arranged in sequence, wherein the PCB is connected with the first radiating component by a first feeding component, a second radiating component and a plurality of metalized vias are arranged on the first dielectric plate, the second radiating component is connected with the PCB by a second feeding component, the plurality of metalized vias are arranged around the first radiating component; and the second radiating component is arranged on an outer side of the plurality of metalized vias. The plurality of metallized vias of the multifunctional GNSS antenna of the present disclosure arranged on the periphery of the first radiating component increase the capacitive coupling and protect the first radiating component located therein, thereby reducing the signal interference and coupling on the first radiating component acted by the third radiating component effectively, which is beneficial to the miniaturization of the antenna.

It should be understood that the above general description and the following detailed description are only exemplary and are not intended to limit the present disclosure.

BRIEF DESCRIPTION OF THE DRAWINGS

The drawings herein are incorporated into the specification and constitute a component of the specification, showing examples consistent with the present disclosure, and are used together with the specification to explain the principle of the disclosure.

Figure 1:
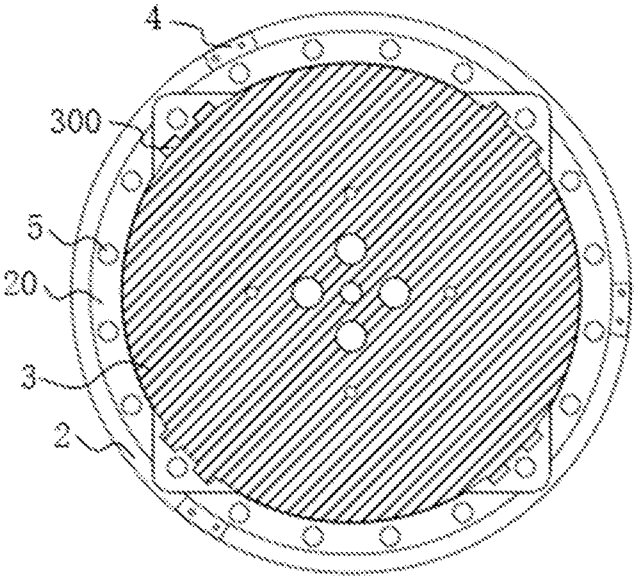
FIG. 1 illustrates a structural schematic diagram of the multifunctional GNSS antenna removing the second dielectric plate of an embodiment of the present disclosure.

The corresponding relationship of the reference signs and the names of the component in FIG. 1 to FIG. 6 is that:

1、PCB; 2、first dielectric board; 3、first radiating component; 4、second radiating component; 5、metallized vias; 6、second dielectric board; 7、third radiating component; 8、shielding cover; 20、boss; 21、cavity; 22、positioning groove; 30、first feeding component; 40、second feeding component; 41、grounding short-circuit post; 60、positioning block; 61、stud; 70、third feeding component; 300、first tuning stub; 400、first metal layer; 401、second metal layer; 402、third metal layer; 403、fourth metal layer; 700、second tuning stub.

DETAILED DESCRIPTION

The exemplary embodiments will be described in detail here, examples being shown in the drawings. The same numbers in different drawings indicate the same or similar elements when the following description refers to the drawings, unless otherwise indicated. The implementation manners described in the following exemplary embodiments do not represent all implementation manners consistent with the present disclosure. On the contrary, they are merely examples of devices and methods consistent with some aspects of the present disclosure as detailed in the appended claims.

Referring to FIG. 1 to FIG. 6, the embodiments of the present disclosure provide a multifunctional GNSS antenna mainly comprising: a PCB 1, a first dielectric plate 2, and a first radiating component 3 arranged in sequence, the PCB 1 is connected with the first radiating component 3 by a first feeding component 30, a second radiating component 4 and a plurality of metalized vias 5 are arranged on the first dielectric plate 2, the second radiating component 4 is connected with the PCB 1, the plurality of metalized vias 5 are arranged around the first radiating component 3; and the second radiating component 4 is arranged on an outer side of the plurality of metalized vias 5.

Figure 2:
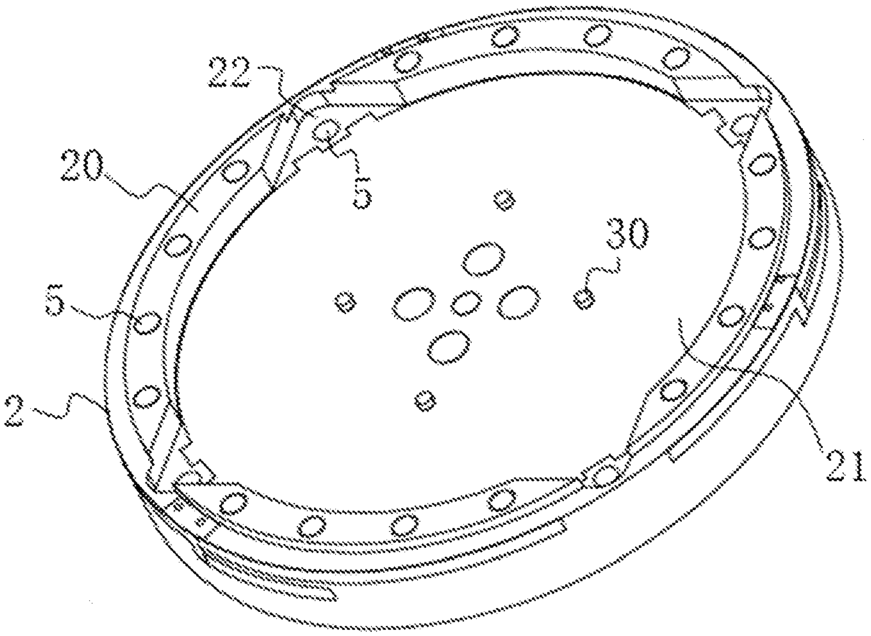
FIG. 2 illustrates the front view of FIG. 1.
Figure 3:
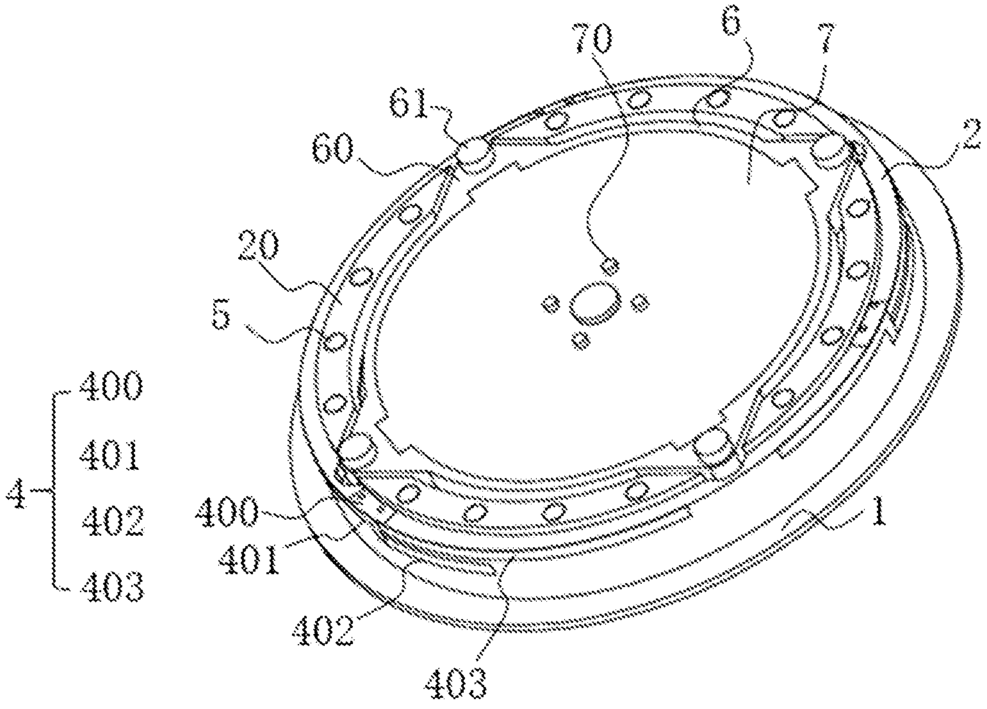
FIG. 3 illustrates a structural schematic diagram of the multifunctional GNSS antenna of an embodiment of the present disclosure.
Figure 4:
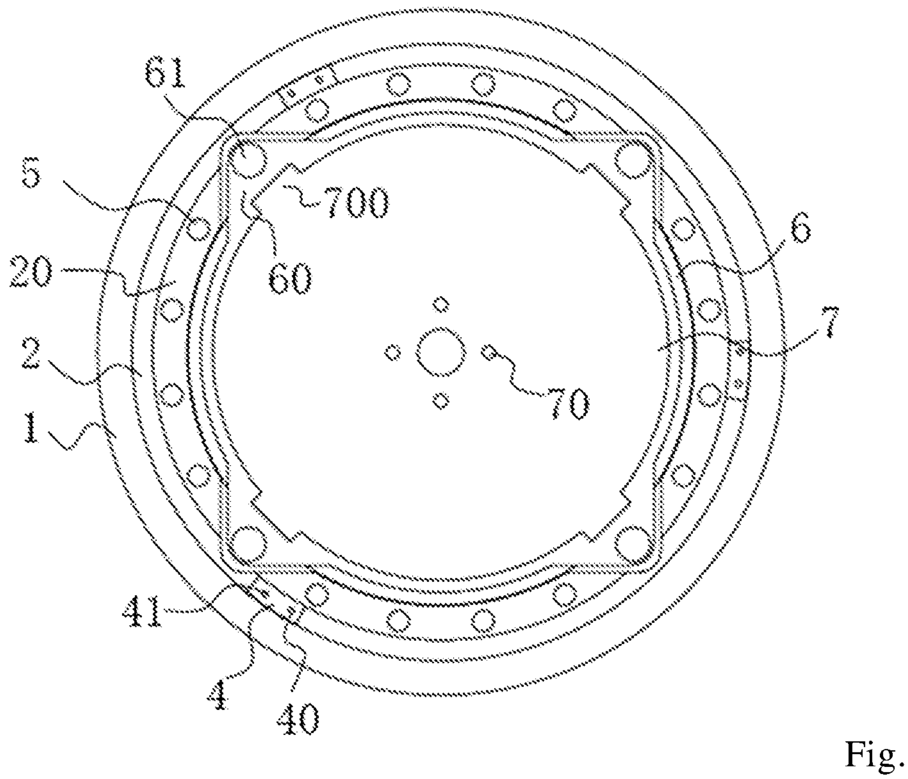
FIG. 4 illustrates the front view of FIG. 3.
Figure 5:
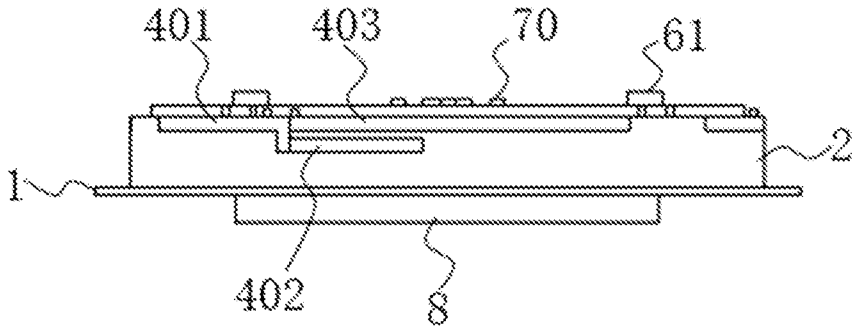
FIG. 5 illustrates a schematic sectional diagram of the multifunctional GNSS antenna of an embodiment of the present disclosure.
Figure 6:
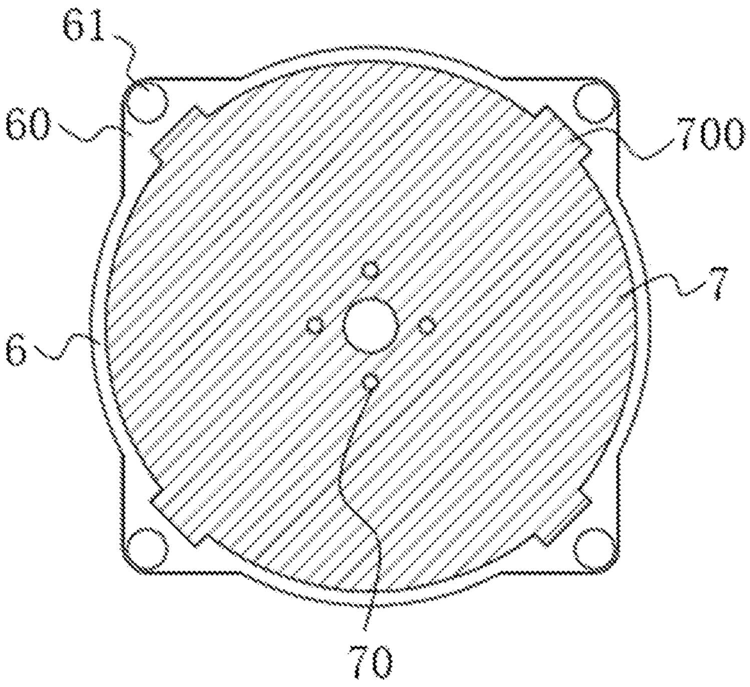
FIG. 6 illustrates a structural schematic diagram of the second dielectric plate of an embodiment of the present disclosure.

During the operation, as shown in FIG. 2, the current generated by second radiating component 4 will be coupled to the first radiating component 3, thereby coupling and interfering with the signal of the first radiating component 3, affecting the performance of the first radiating component 3. In the embodiment, the current on the second radiating component 4 is intervened by means of the plurality of metalized vias 5, so that the current generated on the second radiating component 4 is coupled to the metalized vias 5 and part of the current is radiated out, thereby the energy coupled to the first radiating component 3 is reduced, which improves the isolation and interference of the antenna. In addition, after the current generated by the first radiating component 3 is coupled to the metalized vias 5, the radiating aperture of the first radiating component 3 increases, which reduces the frequency of the first radiating component 3, therefore, the size of the first radiating component 3 decreases while remaining the same resonant frequency, which is beneficial to realize the miniaturization of the antenna.

In an alternative embodiment, the PCB 1, the first dielectric board 2, the first radiating component 3, and the first feeding component 30 constitute a first antenna unit selectively to realize the function of navigation and positioning. The PCB 1, the first dielectric board 2, the second radiating component 4, and the second feeding component 40 constitute a second antenna unit selectively to realize the function of communication, such as 4G communication, Bluetooth communication, etc. Therefore, based on the technical solution of the embodiments of the present disclosure, the integration of the navigation and positioning antenna and the communication antenna can be realized, so that the navigation and positioning, communication and other functions can be realized by one entire antenna, while the interference and coupling of the communication antenna to the navigation and positioning antenna can be reduced and the effect of miniaturization of the antenna can be realized.

In an embodiment of the present application, the metalized vias 5 can be selected to be arranged uniformly along the periphery of the first radiating component 3. The plurality of metallized vias 5 can be selected to surround the entire periphery of the first radiating component 3 to form a ring structure, that is to say to form a protective ring for the first radiating component 3 located in the ring structure, so as to avoid the signal interference and coupling of the antenna device outside the protection ring to the first radiating component 3.

Further, a boss 20 on which the metallized vias 5 are provided is arranged on the first dielectric plate 2 and around the first radiating component 3. In the embodiment, the coupling effect of the metalized vias 5 to the first radiating component 3 and the second radiating component 4 is further improved by the boss 20, thereby improving the isolation extent between the first antenna unit and the second antenna unit.

As shown from FIG. 3 to FIG. 6, the multifunctional GNSS antenna further comprises a second dielectric plate 6 arranged on the first radiating component 3 and a third radiating component 7 arranged on the second dielectric plate 6 and connected with the PCB 1 by means of the third feeding component 70. In the embodiment, the second dielectric plate 6, the third radiating component 7, and the third feeding component 70 can be selected as part of the first antenna unit, wherein the first radiating component 3 and the third radiating component 7 generate different frequency bands respectively. In a specific embodiment, the first radiating component 3 is configured to generate a resonant frequency corresponding to the GNSS L2 frequency band, the third radiating component 7 is configured to generate a resonant frequency corresponding to the GNSS L1 frequency band, and the first antenna unit covers the frequency range of the GNSS L1 and GNSS L2, thereby realizing the function of GNSS navigation and positioning.

The boss 20 extends above the first dielectric plate 2, and a cavity 21 for the installation of the second dielectric plate 6 in the embodiment is formed in the inner ring of the boss 20. Optionally, the boss 20 comprises multiple sections, a positioning groove 22 is arranged between two adjacent sections of the boss 20. A positioning block 60 corresponding to the positioning groove 22 is arranged on the second dielectric plate 6, the positioning block 60 is embedded in the positioning slot 22 when installing the second dielectric board 6. In this embodiment, the second dielectric board 6 can be quickly positioned by means of the cooperating structure of the positioning groove 22 and the positioning block 60, which facilitates the installation of the second dielectric board 6.

In an alternative embodiment, the second dielectric plate 6 is fastened to the first dielectric plate 2 by a stud 61, so as to avoid the loosening of the second dielectric plate 6. In a specific embodiment, the positioning block 60 can be selectively fastened to the positioning groove 22 by the stud 61, wherein the positioning groove 22 may be provided with the above metalized vias 5 cooperated with the stud 61. The metalized vias 5 has the function of fastening of the first dielectric plate 2 and the second dielectric plate 6, and the stud 61 can be selected as an insulating plastic stud or a conductive metal stud.

In an embodiment of the present application, the PCB 1 is provided with a first circuit network and a second circuit network, wherein the first circuit network comprises a feeding network, a first filter circuit, and a low-noise amplifier circuit connected sequentially, the feeding network being connected to the first feeding component 30 and the third feeding component 70 respectively. In this embodiment, after the signal is received by the GNSS antenna, the signal transfers through the feeding networks firstly, then the first filter circuit filters out the communication signals in the signal, such as 4G communication signals, Bluetooth communication signals, etc. via the first filter circuit, finally, the filtered signal is amplified by a low-noise amplifier circuit. Due to the function of the first filter circuit, the communication signal is filtered out, therefore, the signal interference of the communication antenna can be avoided and the accuracy of navigation and positioning can be ensured. The second circuit network comprises a second filter circuit connected with the second feeding component 40. The navigation positioning signal and irrelevant communication signals in the signal are filtered out after the signal transfers through the second filter circuit, for example, the second radiating component 4 is configured to implement 4G communication, while the second filter circuit being further configured to filter out other communication signals apart from the 4G communication signals so as to avoid the interference of other signals.

The first circuit network and the second circuit network can be selectively arranged on the side of the PCB board 1 facing away from the first dielectric board 2. To this end, in an alternative embodiment, a shielding cover 8 is arranged on the side of the PCB board 1 facing away from the first dielectric board 2, the first circuit network and the second circuit network are covered in the shielding cover 8 to prevent interference from external signals.

The first feeding component 30, the second feeding component 40, and the third feeding component 70 can be selected as coaxial probes, taking the first feeding component 30 as an example, the coaxial probes pass through the first dielectric plate 2 and the first radiating component 3 in sequence, with one end being connected to the first radiating component 3 and the other end being connected to the PCB 1. In an alternative embodiment, the first feeding component 30 and the third feeding component 70 can be selected as a plurality of, preferably four coaxial probes, and the second feeding component 40 can be selected as one coaxial probe.

In an embodiment of the present application, the second radiating component 4 is further provided with a grounding short-circuit post 41. Specifically, the grounding short-circuit post 41 penetrates the second radiating component 4, the first dielectric plate 2 and the PCB 1. One end of the grounding short-circuit post 41 is connected to the second radiating component 4, and the other end is connected to ground, for example, the grounded end of the grounding short-circuit post 41 can be selected to connect to a ground plate.

It should be noted that, in an embodiment of the present application, the ground to which the grounding short-circuit post 41 is connected is the same ground as the bottom surface of the first dielectric plate 2. It can also be understood that the ground to which the grounding short-circuit post 41 is connected is different from the bottom surface of the first dielectric plate 6. Therefore, after arranging the second dielectric plate 6 and the third radiating component 7, the signal generated by the second radiating component 4 has little effect on the signal generated by the third radiating component 7.

In an alternative embodiment, the second radiating component 4 comprises a plurality of metal layers connected with each other, the plurality of metal layers comprises at least one metal layer arranged on the surface of the first dielectric plate 2 and at least one metal layer arranged on the side surface of the first dielectric plate 2. In this embodiment, the second radiating component 4 is an inverted-F antenna type, and the plurality of metal layers have different sizes, therefore, the plurality of metal layers have different resonant frequencies to match the signals of different frequency bands. In a specific embodiment, the second radiating component 4 comprises a first metal layer 400, a second metal layer 401, a third metal layer 402, and a fourth metal layer 403, wherein the first metal layer 400 is arranged on the edge of the upper surface of the first dielectric plate 2, the second metal layer 401, the third metal layer 402, and the fourth metal layer 403 are arranged on the side surface of the first dielectric plate 2. The second metal layer 401 and the third metal layer 402 are connected to the first metal layer 400 respectively, and the third metal layer 402 is further connected to the fourth metal layer 403. In this embodiment, the second radiating component 4 realizes horizontal omnidirectional radiating.

In an alternative embodiment, the GNSS antenna comprises a plurality of second radiating components 4 arranged in circumferential direction along the perimeter of the first dielectric plate 2. Wherein the plurality of second radiating components 4 can be selected to implement different functions, for example, the plurality of second radiating components 4 can be selected to comprise: a second radiating component 4 configured to realize 4G communication function and a second radiating component 4 configured to realize Bluetooth communication function. In a specific embodiment, there are three of the second radiating components 4, wherein one of the second radiating components 4 is configured to realize Bluetooth communication, and the other two are configured to realize 4G communication. In this embodiment, the second radiating component 4 configured to realize Bluetooth communication form a Bluetooth antenna together with the PCB 1, the first dielectric board 2 and the corresponding second feeding component 5, the second radiating component 4 for realizing 4G communication form a 4G communication antenna together with the PCB board 1, the first dielectric board 2, and the corresponding second feeding component, wherein the 4G communication antenna adopts two radiating components for high-speed data transmission, in general, one radiating component can also be adopted by the 4G communication antenna.

In an embodiment of the present application, the first radiating component 3 can be selected as a metal layer attached to the upper surface of the first dielectric plate 2, and the third radiating component 7 can be selected as a metal layer attached to the upper surface of the second dielectric plate 6.

The edge of the first radiating component 3 is provided with a first tuning stub 300 extending outward, configured to fine-tune the resonant frequency of the first radiating component 3; the edge of the third radiating component 7 is provided with a second tuning stub 700 extending outward, configured to fine-tune the resonant frequency of the third radiating component 4.

In summary, the multifunctional GNSS antenna of the embodiments of the present disclosure has the functions of GNSS navigation and positioning, 4G communication and Bluetooth communication at the same time, with the multiple antenna functions integrating on one antenna, which significantly saves the installation space compared to multiple antennas designed separately. Based on the integration of multiple antennas, in the embodiments of the present disclosure, each antenna has good isolation and anti-interference ability respect to another, therefore, the performance of the multifunctional GNSS antenna can be ensured, especially the interference and coupling of the communication antenna to it can be reduced when the first antenna unit is used as a navigation and positioning antenna to ensure the positioning accuracy and avoid the phenomenon of satellite lock-out; the metalized vias further couple with the first radiating component, thereby increasing the radiating aperture of the first radiating component, so that the resonant frequency of the first radiating component is reduced, accordingly, in order to achieve the preset resonant frequency, the required size of the first radiating component is correspondingly reduced, further causing the size of the entire antenna to reduce correspondingly, which is beneficial to the miniaturized design of the antenna.

In the description of this disclosure, it should be noted that the orientation or positional relationship indicated by the terms "upper", "lower", etc. is based on the orientation or positional relationship shown in the accompanying drawings, and is only used for the convenience of describing the disclosure and simplifying the description, but not to indicate or imply that the device or element referred to must have a particular orientation, be constructed and operate in a particular orientation, and therefore should not be construed as limiting the disclosure. Furthermore, the terms "first" and "second" are used for descriptive purposes only and should not be construed to indicate or imply relative importance.

In the description of this disclosure, it should be noted that, unless otherwise expressly specified and limited, the terms "installation", "communication" and "connection" should be understood in a broad sense, for example, it may be a fixed connection or a detachable connection, or integral connection; may be mechanical connection or electrical connection; may be direct communication, or indirect communication by means of an intermediate medium, or internal communication between two elements. For those of ordinary skilled in the art, the specific meanings of the above terms in this disclosure can be understood in specific situations. Furthermore, in the description of this disclosure, unless otherwise specified, "plurality" means two or more.

The above are only preferred embodiments of the present disclosure, and are not intended to limit the present disclosure. Any modifications, equivalent replacements, improvements, etc. made within the spirit and principles of the present disclosure shall be included in the protection range of the present disclosure.

What is claimed is:

1. A multifunctional GNSS antenna, comprising:
- a PCB, a first dielectric plate, and a first radiating component arranged in sequence;
- wherein the PCB is connected with the first radiating component by a first feeding component;
- a second radiating component and a plurality of metalized vias are arranged on the first dielectric plate;
- the second radiating component is connected with the PCB by a second feeding component;
- the plurality of metalized vias are arranged around the first radiating component; and
- the second radiating component is arranged on an outer side of the plurality of metalized vias.

2. The multifunctional GNSS antenna of claim 1, wherein the first dielectric plate is provided with a boss arranged around the first radiating component and provided with the metalized vias.

3. The multifunctional GNSS antenna of claim 2, further comprising:
- a second dielectric plate arranged on the first radiating component and a third radiating component arranged on the second dielectric board; and
- wherein the third radiating component is connected with the PCB by a third feeding component.

4. The multifunctional GNSS antenna of claim 3, wherein the boss comprises a plurality of sections along the circumferential direction of the first radiating component, a positioning groove is arranged between the two adjacent sections of the boss, and a positioning block embedded in the positioning groove is provided on the second dielectric plate.

5. The multifunctional GNSS antenna of claim 4, wherein the metalized vias is provided in the positioning groove, the positioning block is fastened with the positioning groove by a stud cooperated with the metalized vias located on the positioning groove.

6. The multifunctional GNSS antenna of claim 3, wherein the PCB is provided with a first circuit network and a second circuit network;
- the first circuit network comprises a feeding network, a first filter circuit, and a low-noise amplifier circuit connected in sequence;
- the feeding network is connected with the first feeding component and said third feeding component, respectively; and
- the second circuit network comprises a second filter circuit connected with the second feeding component.

7. The multifunctional GNSS antenna of claim 6, wherein the first circuit network and the second circuit network are arranged on a side of the PCB away from the first dielectric board;
- a shielding cover is arranged on the side of the PCB away from the first dielectric board; and
- the first circuit network and the second circuit network are covered inside the shielding cover.

8. The multifunctional GNSS antenna of claim 1, wherein the second radiating component is provided with a grounding short-circuit post;

an end of the grounding short-circuit post is connected with the second radiating component; and another end of the grounding short-circuit post is grounded.

9. The multifunctional GNSS antenna of claim 8, wherein the second radiating component comprises a plurality of metal layers connected with each other; and the plurality of the metal layers comprises at least one metal layer arranged on a surface of the first dielectric plate and at least one metal layer arranged on a side surface of the first dielectric plate.

10. The multifunctional GNSS antenna of claim 9, further comprising:

a plurality of the second radiating components arranged along the circumferential direction of the perimeter of the first dielectric plate.

* * * * *